March 20, 1956     G. K. C. HARDESTY     2,738,759
ILLUMINATING ASSEMBLY FOR INDICATING INSTRUMENTS Filed Aug. 22, 1952

INVENTOR.
GEORGE K.C. HARDESTY
BY *Wilson R Maltby*
*George Lipkin*
ATTORNEY

[U](U)nited States Patent Office 2,738,759
Patented Mar. 20, 1956

2,738,759
ILLUMINATING ASSEMBLY FOR INDICATING INSTRUMENTS

George K. C. Hardesty, Mayo, Md.

Application August 22, 1952, Serial No. 305,930

1 Claim. (Cl. 116—129)

(Granted under Title 35, U. S. Code (1952), sec. 266)

The invention described herein may be manufactured and used by or for the Government of the United States of America for governmental purposes without the payment of any royalties thereon or therefor.

The invention relates to illumination of dial type instruments and, more particularly, to means providing face illumination of the full 360 degrees of a dial, without shadow effects from electrical conductors to the illuminating lamp, and without complications of brush contacts.

Various arrangements have previously been used for illuminating the face of a clock, meter or other instrument to provide night visibility thereof. Among these are edge illumination devices, which are generally complex and expensive with insufficient illumination resulting from the inefficient light transmission to the instrument face. Another form of illumination involves a central light source within the face and in front of the dial, to which energy is supplied by conductors crossing the dial face and thereby causing shadows and obscuring a portion of the dial and the indicia thereon, or interfering with the movement of any pointers associated therewith.

The present invention is an improvement in face illumination achieved by employement of one, or more, light sources, either at the center or at points distributed over the face of the instrument to which energy is supplied by means of invisible conductors, which, therefore, do not leave shadows or obscure indicia or indicators and do not interfere with movement of the indicators.

It is, therefore, an object of the invention to provide an illuminated dial and indicating means for an instrument which is uniformly lighted without obscurance of, or interference with, indications thereon.

A further object of the invention is to provide simple and improved means of uniformly lighting an instrument face.

A still further object is to provide invisible means for energizing an instrument lamp.

Another object is to provide a transparent laminated instrument face containing conductors for energization of an illuminating device, or an indicator therefore.

With these and other objects in view, as will hereinafter more fully appear, and which will be more particularly pointed out in the appended claim, reference is now made to the following description taken in connection with the accompanying drawings in which:

Figure 1:
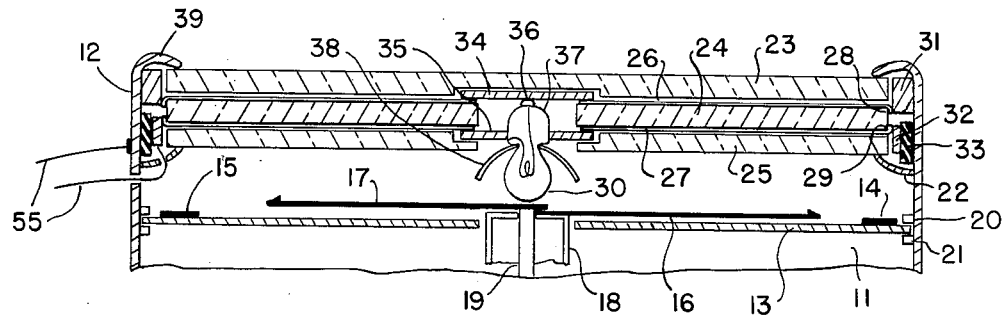
Fig. 1 shows a vertical section of a preferred embodiment of the invention employing front illumination.

Referring now to the drawing wherein like characters represent like parts throughout the several views, there is illustrated the upper portion of an instrument 11 having a casing 12 and a dial plate 13 with indicia 14 and 15 thereon, over which indicators 16 and 17 operate to provide information desired. Hollow shaft 18 and shaft 19, shown broken away, extend to the mechanism of the instrument to provide rotation of indicators 16 and 17.

The dial 13 is supported in any conventional manner in casing 12, for instance by rings 20 and 21 which may engage grooves or threads in the casing 12 or may be secured thereto by soldering, screws, or the like. The casing is preferably provided with a further ring 22 adapted to support a transparent instrument face consisting, for example, of a laminated transparent structure including transparent plates 23, 24 and 25 of glass or plastic, as may be desired, and having therebetween transparent conducting layers 26 and 27 therein employed for bringing electrical current to the center of the instrument face for operating a light source.

Conducting layers 26 and 27 are preferably provided at the edges of plates 23, 24 and 25, or some of them, with turned over portions 28 and 29, illustrated in Fig. 1 as turned over the plate 24 to form a conductor around the periphery. While the layers 26 and 27 are illustrated as discs or sheets of material covering the face of the instrument within the casing 12, it will be understood that they may comprise strips of transparent conducting paint across from one side of the face to the center, or of a plurality of such strips. The material of these strips may be any of the presently known transparent conductor materials, for example, silver chloride. While layers 26 and 27 are shown as having appreciable thickness they may consist of very thin deposited layers of material, such as might be applied by sputtering techniques, and may be of molecular dimensions. Where a thin deposited layer of the conducting material is applied, it is preferable to employ at least a large portion of the face area in order that the thin conductive layer may be able to carry sufficient electrical current without undue heating or voltage drop.

A power source may be connected to the conducting layers 26 and 27 in any convenient manner as by pads, pressure plates, or other suitable contact making means. In Fig. 1, connection is made by means of a ring 31 within the casing 12 and extending circumferentially around plate 24. Ring 31 is adapted to fit snugly against the turned up edge 28 and is illustrated as forming electrical contact between the edge 28 and the casing 12. Likewise turned up edge 29 forms contact with a similar ring 32 snugly fitted thereabout. To provide insulation between ring 32 and casing 12 an insulating ring 33 of rubber or plastic is provided between elements 32 and 12. The casing 12 and ring 32 may then be energized by connection of leads 55 from a power source thereto.

In order to provide a suitable rigid and durable connection to lamp bulb 30, a disc 34 may be employed illustratively shown as recessed within plate 23 and of thickness at least equal to the extent of the recess such that disc 34 bears against conducting layer 26 at the center of the face. Plates 24 and 25 are preferably equipped with a central aperture to receive lamp 30, which may be supported by ring 35 which in turn makes electrical contact with the outer shell element normally a part of small instrument lamps, whether of the screw type or other form as may be desired. To provide contact between ring 35 and conducting layer 27 plate 25 is conveniently recessed in the outer surface thereof for a short distance around the central opening which receives lamp 30. The recess is made slightly shallower than the thickness of ring 35 in order that contact between the ring and the layer 27 will be assured as plates 23 and 25 are pressed against plate 24. The lamp is illustrated as having a central end terminal 36 bearing against disc 34 and shell member 37 contacting, and supported by, ring 35. It is further desirable to employ a shade 38 to prevent direct transmission of light from lamp 30 to and through the face plates of the instrument.

The assembly comprising plates 23, 24 and 25, conducting layers 26 and 27, and conducting elements 34 and 35, may conveniently form a composite transparent face either cemented together by a suitable transparent adhesive or may merely be held in mutual contact between ring 22 and a suitable pressure ring attached to casing 12 such as illustrated in Fig. 1 as a turned over edge 39. For convenience in disassembling, the holding means 39 may be threaded ring or pressure ring forming a part of casing 12.

Figure 2:
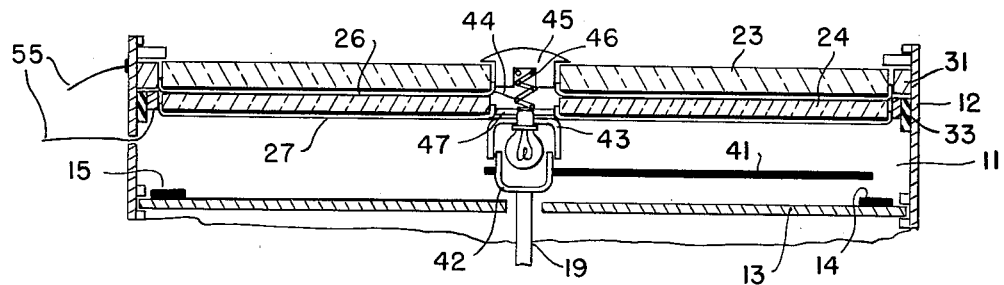
Fig. 2 illustrates in vertical section an alternate form of the invention employing an internally illuminated indicator.

In Fig. 2 there is illustrated a simpler construction of a composite transparent conducting face plate or sandwich comprising elements 23, 24, 26 and 27 where the elements 26 and 27 are deposited on or cemented to elements 23 and 24, thus making the third supporting plate 25 unnecessary. A further modification of the instrument of Fig. 1 is illustrated as comprising an indicator arm 41 of transparent light-conducting plastic which serves as the means of transmitting light from lamp 30 to the indicia illustrated at 14 and 15. Various shapes and designs for such a light-conducting arm 41 are known in the art and are not further described here. The shaft 19 is preferably provided with an opaque cup 42 surrounding the lamp and supporting arm 41, the cup being provided with window openings as desired thereabout for facilitating transmission of light from the cup to the indicating arm 41. The lamp itself may be supported in any convenient manner, being illustrated as attached by a press fit to a second cup 43 suspended from plate 24 and electrically connected to a conducting layer 27 as by leads 47, energizing means being completed by connecting one terminal of the lamp with conductor 26 as illustrated at 44 and 46. Access to the lamp for replacement or adjustment purposes may be provided in the form of an aperture in plate 23 closed by button 45.

General illumination of the face of the instrument of Fig. 2 may be provided by forming the side walls of cups 42 and 43 with transparent light diffusing windows.

Figure 3:
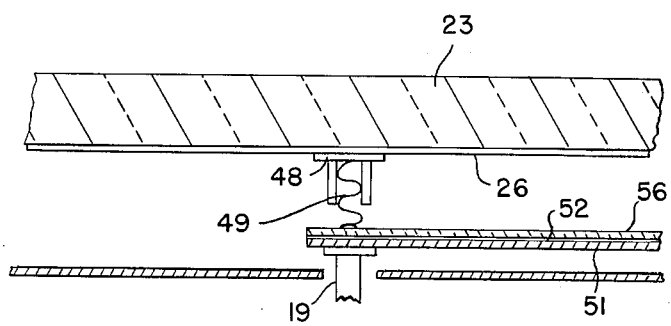
Fig. 3 illustrates in vertical section an alternate form of the invention similar to that of Fig. 2, except employing a single thickness of glass cover with transparent conducting layer secured thereto.

In Fig. 3, an indicator member 51 is illustrated as attached to shaft 19, the member 51 being of special design to render the same visible apart from general illumination of the face. With the construction of Fig. 3 employing a plate 23 and conducting layer 26 thereon with a contacting member 48 centrally located for supplying energy to an illuminating device, a lamp such as 30 could be employed with one terminal connected to 48 by a suitable lead and the other terminal connected to shaft 19, in the general manner illustrated in Fig. 2. A further modification permits use of a position indicating member 51 without general illumination. This modification employs a metallic backing at 51 with a coating of material 52 thereon which is electro-luminescent. This material has the characteristic of visibly glowing when an electric potential is imposed thereacross. For this purpose, a layer of transparent conducting material 56 may be deposited on the layer 52 of luminescent material. A flexible lead, or pig tail, 49 may then extend from the pad 48 to make contact with the circuit of layer 56, which serves to distribute electrical potential over the front face of the indicator element. The layer 52 is non-conducting and supports the potential difference applied between layer 56 and member 51, the latter member being grounded through shaft 19. In this case only the indicating hand is seen as the instrument is observed. Regardless of the type illumination used in the construction of Fig. 3, a single conducting layer 26 replaces the sandwich of Fig. 1 or Fig. 2. Conductors 55 are then conveniently attached by soldering or other means as convenient to the casing 12 and the conducting layer 26.

It may be noted that when the resistance of the thin sheet conductor is selected to provide particular voltage drops and consequent heating effects as desired the transparent face conductor becomes an efficient means for defrosting and for preventing formation of moisture on, or fogging of, the instrument face.

Obviously many modifications and variations of the present invention are possible in the light of the above teachings. It is therefore to be understood, that within the scope of the appended claim, the invention may be practiced otherwise than as specifically described.

What is claimed is:

An illuminated indicator comprising a casing, a dial face mounted within said casing, indicia means mounted about the periphery of said dial face, a transparent cover plate mounted within said casing, said plate comprising a plurality of alternate sheets of transparent material and transparent conducting material, light means energized from a power source through said transparent conducting sheets, said light means being centrally secured to said cover plate, means secured to said cover plate and partially shielding said light means, a shaft mounted centrally of said dial face, an opaque means mounted on said shaft and encompassing said partially shielded light means, a window formed in said opaque means, and a light conducting indicator arm mounted in said window and extending to said indicia whereby light from said light means is utilized to illuminate only the indicia to which said arm extends.

References Cited in the file of this patent

UNITED STATES PATENTS

| 2,172,765 | Kollsman | Sept. 12, 1939 |
| 2,272,806 | Klein et al. | Feb. 10, 1942 |
| 2,290,278 | Failla | July 21, 1942 |
| 2,314,817 | Christensen | Mar. 23, 1943 |
| 2,429,420 | McMaster | Oct. 21, 1947 |
| 2,599,710 | Hathaway | June 10, 1952 |
| 2,702,340 | Thieblot | Feb. 15, 1955 |